United States Patent
Gonzalez et al.

(10) Patent No.: US 10,947,137 B2
(45) Date of Patent: Mar. 16, 2021

(54) PROCESS FOR TREATMENT OF MINE IMPACTED WATER

(71) Applicant: TECK RESOURCES LIMITED, Vancouver (CA)

(72) Inventors: Jose Alberto Gonzalez, Trail (CA); Farid Vaezi Ghobaeiyeh, Castlegar (CA); Douglas John McKay, Rossland (CA)

(73) Assignee: TECK RESOURCES LIMITED, Vancouver (CA)

( * ) Notice: Subject to any disclaimer, the term of this patent is extended or adjusted under 35 U.S.C. 154(b) by 618 days.

(21) Appl. No.: 15/835,104

(22) Filed: Dec. 7, 2017

(65) Prior Publication Data

US 2019/0177196 A1    Jun. 13, 2019

(51) Int. Cl.
| | |
|---|---|
| *C02F 1/78* | (2006.01) |
| *C02F 1/72* | (2006.01) |
| *C02F 103/10* | (2006.01) |
| *C02F 101/10* | (2006.01) |
| *C02F 1/32* | (2006.01) |
| *C02F 1/70* | (2006.01) |
| *C02F 1/28* | (2006.01) |

(52) U.S. Cl.
CPC .............. *C02F 1/78* (2013.01); *C02F 1/722* (2013.01); *C02F 1/283* (2013.01); *C02F 1/32* (2013.01); *C02F 1/70* (2013.01); *C02F 2101/106* (2013.01); *C02F 2103/10* (2013.01); *C02F 2303/18* (2013.01); *C02F 2305/023* (2013.01)

(58) Field of Classification Search
CPC ........ C02F 1/78; C02F 1/722; C02F 2103/10; C02F 1/283; C02F 1/70; C02F 2101/106; C02F 2305/023; C02F 2303/18; C02F 1/32
See application file for complete search history.

(56) References Cited

U.S. PATENT DOCUMENTS

| | | |
|---|---|---|
| 5,200,082 A | 4/1993 | Olsen et al. |
| 7,115,201 B2 | 10/2006 | Rey |
| 7,270,728 B2 | 9/2007 | Guo et al. |
| 10,144,662 B2 * | 12/2018 | Kreczinski ............... C02F 1/04 |

(Continued)

FOREIGN PATENT DOCUMENTS

| | | | |
|---|---|---|---|
| WO | 2006116421 A1 | 11/2006 | |
| WO | WO-2006116421 A1 * | 11/2006 | .......... B01J 20/0281 |

(Continued)

OTHER PUBLICATIONS

International Patent Application No. PCT/CA2018/051421, International Preliminary Report on Patentability dated Feb. 27, 2020.

(Continued)

*Primary Examiner* — Cameron J Allen
(74) *Attorney, Agent, or Firm* — Borden, Ladner, Gervais, LLP; Geoffrey deKleine (57) ABSTRACT

A process for treating mine impacted water containing one or more reduced selenium species by an advanced oxidation process (AOP) including ozone and ultraviolet light, or ozone and hydrogen peroxide is disclosed. The process oxidizes the one or more reduced selenium species to selenate and thereby produces AOP treated water. Residual oxidants are removed from the AOP treated water.

20 Claims, 2 Drawing Sheets

(56) References Cited

U.S. PATENT DOCUMENTS

| | | |
|---|---|---|
| 2003/0132166 A1 | 7/2003 | Rey |
| 2011/0024352 A1* | 2/2011 | Butters .................. C02F 1/725 |
| | | 210/617 |
| 2012/0211426 A1* | 8/2012 | Santoro .................... C02F 9/00 |
| | | 210/665 |
| 2014/0042105 A1* | 2/2014 | McAdams ............. C02F 1/722 |
| | | 210/759 |
| 2015/0013987 A1 | 1/2015 | Underwood et al. |
| 2016/0115053 A1* | 4/2016 | Okino .................... C02F 1/722 |
| | | 210/721 |
| 2018/0265375 A1* | 9/2018 | Sarathy .................... C02F 1/32 |

FOREIGN PATENT DOCUMENTS

| | | |
|---|---|---|
| WO | 2009005834 A2 | 1/2009 |
| WO | 2009117141 A1 | 9/2009 |
| WO | 2013016775 A1 | 2/2013 |
| WO | 2013041898 A1 | 3/2013 |
| WO | 2017070347 A1 | 4/2017 |

OTHER PUBLICATIONS

International Patent Application No. PCT/CA2018/051421, International Search Report and Written Opinion dated Jan. 29, 2019.

\* cited by examiner

PROCESS FOR TREATMENT OF MINE IMPACTED WATER

TECHNICAL FIELD

The present application relates to the treatment of mine impacted water.

BACKGROUND

Mine impacted water (MIW) is water that has been impacted by a mining operation. Such water may include run-off water that has contacted waste rock dumps generated during mining of coal, copper, or zinc. Over time chemical and biological processes can become established within waste rock dumps, gradually releasing constituents of interest from the waste rock to the MIW.

Substantial removal of constituents of interest present in MIW can be done using physical-chemical or biological water treatment processes or a combination thereof depending on the constituents of interest to be removed.

For the purposes of the present application, MIW includes influent water to or effluent water from the aforementioned physical-chemical or biological water treatment processes, which can be active, semi-passive (e.g. saturated rock fills), or passive (e.g. wetlands) water treatment facilities in which key constituents of interest are substantially removed.

Selenium, a key constituents of interest, may be present in MIW and removal of selenium from MIW is desirable because of the possible effect that selenium, above certain concentrations, may have on aquatic life and organisms.

Many active, passive, and semi-passive water treatment processes have been identified to remove selenium species from water. Processes using biological treatment are currently utilized to remove selenium species from MIW. The final effluent from biological treatment processes may contain selenium in reduced oxidation states in the form of organic and inorganic compounds.

Soluble selenium species exist in any of the (+6), (+4), (+2), (−1) and (−2) oxidation states.

The least bioavailable form of soluble selenium in receiving environments is the selenate oxyanion in which selenium exists in the (+6) oxidation state. Thus, if selenium is present in MIW, the (+6) form of selenium is desirable because this form of soluble selenium is the least bioavailable.

PCT patent application publication WO 2013/041898 describes a method for removing trace organic and volatile selenium species present in drinking water. Some of these species were considered contributors to bad odour in the water. The described method includes adsorption of reduced selenium species on media containing oxides of either iron, aluminium, or titanium. Reduced selenium species were largely adsorbed on the media and then partially removed from the media by passing ozonated water through the media. Selenium accumulation in the media was significant and in some cases less than one percent of the selenium present in the media was removed by ozonated water.

PCT patent application publication WO 2009/005834 describes the introduction of ozone to the soil of a contaminated site followed by periodic addition of hydrogen peroxide to inhibit formation of hexavalent chromium within the soil.

PCT Patent application publication WO 2009117141 discloses a modular water treatment apparatus that utilizes side stream injection of ozone. The system utilizes ozone, with or without hydrogen peroxide, for disinfection or decontamination of the wastewater. The disinfected or decontaminated water is suitable for reuse.

PCT Patent application publication WO 2017070347 describes a method and system for decreasing the concentration of selenium species in water, particularly water containing difficult-to-remove selenium species. Water containing selenium is first treated with potassium permanganate then treated in a two-step system comprising (a) a reactive solid containing zero-valent iron and iron oxide minerals in contact therewith and (b) ferrous iron. Thus, a chemical oxidant is utilized to oxidize the reduced selenium species (mostly selenite) to selenate as a pre-treatment to a physical-chemical treatment process (in this case a zero-valent iron process). For the water tested, potassium permanganate is the preferred oxidant. Hypochlorite is also utilized.

None of the above-noted references address the treatment of various selenium species present in MIW using an advanced oxidation process (AOP) system.

SUMMARY

According to a first aspect, a process for treating MIW including one or more selenium species is provided. The process includes subjecting the MIW to an advanced oxidation process (AOP). The process includes subjecting the MIW to an AOP including ultraviolet light and ozone or ozone and hydrogen peroxide to oxidize the one or more selenium species to selenate and thereby provide an AOP treated water. Residual oxidants are then removed from the AOP treated water.

The primary treatment objective of AOP is to oxidize selenium compounds present in MIW to selenate, thereby producing an AOP-treated water that decreases selenium bioavailability of the treated water. Residual oxidants left after AOP treatment (mainly ozone and hydrogen peroxide) are removed utilizing either chemical or physical-chemical means.

Other aspects and features of the present application will become apparent to those ordinarily skilled in the art upon review of the following description of specific embodiments of the application in conjunction with the accompanying figures.

BRIEF DESCRIPTION OF THE DRAWINGS

Embodiments of the present application will now be described, by way of example only, with reference to the attached figures, in which.

DETAILED DESCRIPTION

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Generally, the present application discloses a process for treating MIW that contains one or more selenium species. The process includes subjecting the MIW to an advanced oxidation process (AOP) including ultraviolet light and ozone or ozone and hydrogen peroxide to oxidize the one or more selenium species to selenate and thereby provide an AOP treated water. Residual oxidants are then removed from the AOP treated water.

As utilized herein, MIW refers to water that has been impacted by a mining operation such as a coal, zinc, or copper mining operation.

Water soluble reduced selenium species present in MIW are those species in which selenium has an oxidation state less than (+6), including selenite ion, selenocyanate and selenosulfate ions, low-molecular weight semi-volatile species (e.g., dimethylselenide and dimethyldiselenide), and organoselenium species such as dimethylselenoxide, methylseleninic acid and seleno-amino acids such as selenomethionine and selenocysteine.

Because selenium in the (+6) oxidation state (selenate) is the least bioavailable form of dissolved selenium, it is desirable to oxidize reduced selenium species to selenate. This is particularly important when MIW is treated to remove dissolved selenium by a water treatment facility (WTF) utilizing biological treatment processes. Although, the dissolved selenium concentration in MIW after a biological WTF may be lower than 20 µg/L, some of this selenium may be present in reduced oxidation states, often mostly in the (+4) oxidation state as selenite ion ($SeO_3^{2-}$), but with material amounts of organoselenium species.

Reduced selenium species present in MIW may be oxidized by an AOP. The feed to AOP may be MIW at any state, that is as untreated water from waste rock dumps, or water after full or partial treatment to remove selenium in a WTF. Treating MIW at the end of a WTF process train with an AOP is desirable because the WTF process also decreases the total selenium concentration in the water discharged to the receiving environment.

Figure 1:
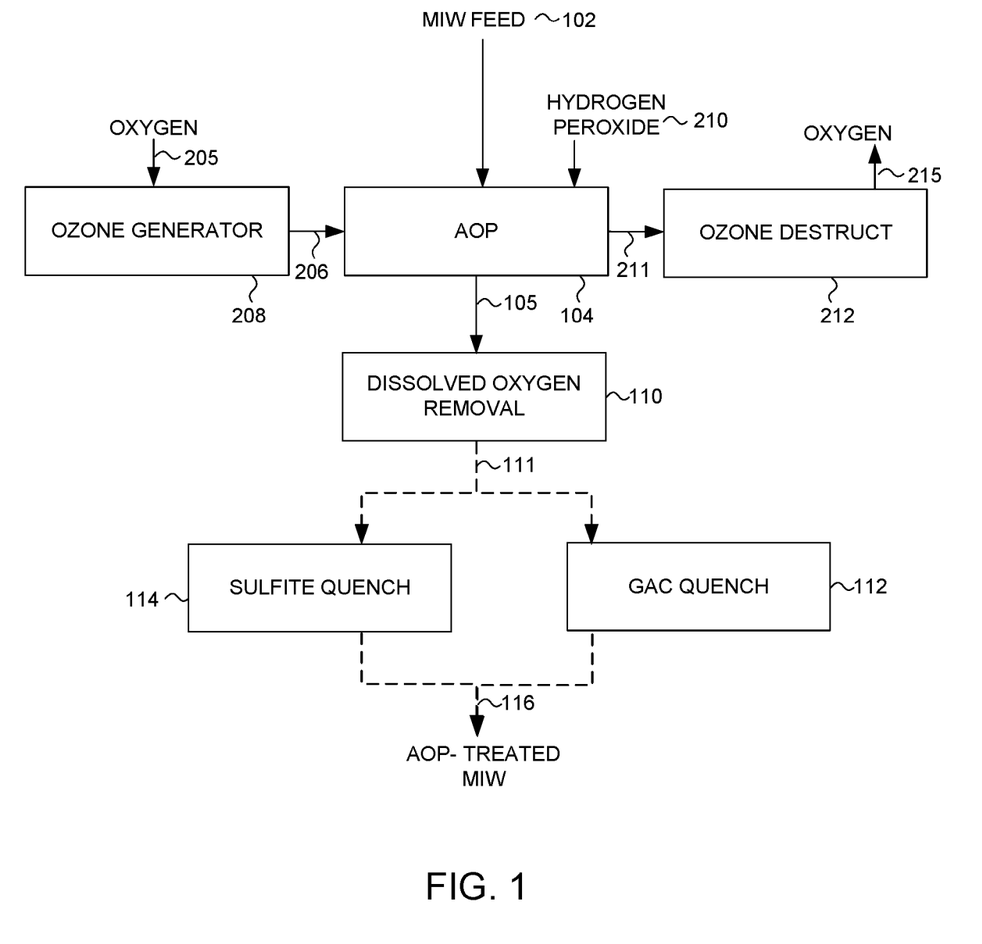
FIG. 1 is a simplified process flow diagram illustrating a process for treating MIW in accordance with an embodiment.

Referring now to FIG. 1, a process for treating MIW is shown. As illustrated in FIG. 1, MIW 102 is subjected to an AOP treatment at 104. The AOP 104 is carried out in presence of ozone 206 generated in a commercially available ozone generator 208 that produces ozone gas from oxygen 205, at concentrations of 2% to 20% weight (the remainder is principally oxygen carrier gas). The targeted transfer of ozone to water ranges from 3 mg/L to 25 mg/L. Ozone transfer is achieved by injecting the oxygen-ozone gas mixture 206 into the MIW 102 utilizing a suitable commercially-available ozone injection system. Ozone transfer efficiency (defined as the difference between feed gas and off-gas ozone concentrations divided by ozone concentration in feed gas) in commercial systems may be over 90%, and may be higher than 95%.

Prior to or shortly after ozone addition to the MIW 102, hydrogen peroxide 210 is added to the MIW to achieve a hydrogen peroxide concentration in the range from 1 to 25 mg/L. Hydrogen peroxide is added to a target initial hydrogen peroxide to ozone transferred mass ratio of 0.2 to 2, preferably 0.4 to 0.7. The AOP reactions then progress in single- or multi-stage commercially-available contactors to achieve a desired gas-liquid contact time.

The total contact time of the MIW 102 with ozone 206 and hydrogen peroxide 210 in the AOP treatment 104 may be 1 to 10 minutes and preferably 3 to 6 minutes. The oxidation reaction of selenium species may be completed in less than 1 minute, and the remainder of the residence time in the contactors is utilized to separate and remove the excess gases (namely ozone and oxygen mixture) from water.

The released off-gases 211 after AOP treatment are captured and sent to an ozone destruct system 212 where ozone is converted to oxygen 215, which is then vented to atmosphere.

A fraction of the excess dissolved oxygen present in the AOP treated water (produced from decomposition of the injected ozone) is removed utilizing a suitable dissolved oxygen removal process 110, such as a water cascade system or a deaeration tank. The dissolved oxygen concentration present in the AOP treated water may still be above its saturation level (up to 10 mg/L), after subjecting the water to the dissolved oxygen removal process 110. The presence of this excess dissolved oxygen does not appear to interfere with the subsequent quenching step 112 or 114.

After the dissolved oxygen removal step, stream 111 is treated in a quenching step 112 or 114. Quenching is utilized to remove residual ozone and hydrogen peroxide in the water to values below 10 µg/L and 0.5 mg/L, respectively, because both of these oxidants may be toxic to aquatic life at above these concentrations. Removal of residual oxidants by quenching to these target values is effective despite still having excess dissolved oxygen in the water.

Residual ozone in the water is not stable and may decay within tens of minutes. Hydrogen peroxide also decays over time but at much slower rates (tens of hours). Also, if residual hydrogen peroxide is present in stream 105, residual ozone may be less than 10 µg/L. In absence of hydrogen peroxide in steam 105, residual ozone concentrations may be higher than 10 µg/L.

Both residual ozone and hydrogen peroxide may be sufficiently removed in a quenching step utilizing a variety of methods, for example utilizing reducing agents such as sodium or potassium sulfite or thiosulfate salts, or utilizing granular activated carbon bed filters, or sand bed filters.

Residual oxidants may be removed by passing stream 111 through a granular activated carbon column 112 having an empty bed contact time (EBCT) of 2 to 10 minutes. Alternatively, residual oxidants may be removed by sodium sulfite 114 utilizing, for example, 10 to 80 mg sodium sulfite per L of water. Sodium sulfite dosage of 20 mg/L may be sufficient if residual hydrogen peroxide in stream 111 is less than 1 mg/L and residual ozone is less than 10 µg/L.

After quenching step 112 or 114, at least 90% of the dissolved selenium present in the MIW treated by the AOP system, stream 116, is present as selenate ions. A fraction of the remaining dissolved selenium species present in stream 116 are selenite ions. This is a significant improvement from MIW feed 102 in which, for some streams (e.g., after a WTF) less than 30% of the dissolved selenium can be present as selenate ions. Thus, depending on the total concentration of reduced selenium species in the feed MIW 102 to be treated, selenite concentration in the resulting AOP treated MIW 116 may be less than 2 µg/L, and may be less than 0.5 µg/L. Other residual reduced selenium species may be present in MIW 116, at values close to or below analytical detection limits.

The AOP treated MIW 116 contains low concentrations of selenite ions and reduced selenium species. After equilibration with air (that brings the dissolved oxygen concentration to near its saturation value), MIW treated by the AOP system 116 may be further processed or discharged to the receiving environment.

Figure 2:
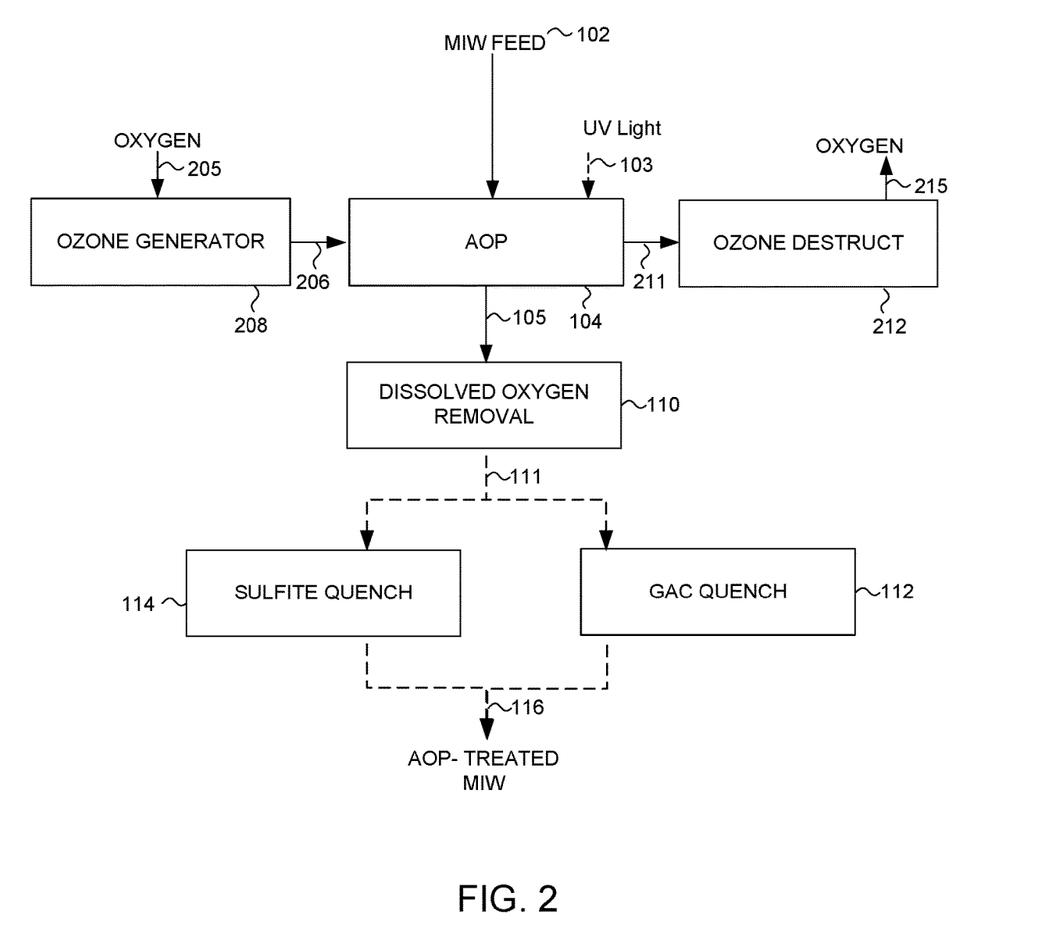
FIG. 2 is a simplified process flow diagram illustrating a process for treating MIW in accordance with another embodiment.

Referring now to FIG. 2, another process for treating MIW is shown. As illustrated in FIG. 2, the MIW 102 may be subjected to AOP treatment at 104 in presence of ultraviolet light (UV) 103 with continuous addition of ozone 206.

UV dosage may range from 1.4 to 2.4 Wh/L, with continuous addition of ozone resulting in applied ozone dosages of from 47 to 57 mg/L.

The remaining processes indicated in FIG. 2 may be similar to those shown in FIG. 1 and described above. In the present example, utilizing UV, no residual hydrogen peroxide is expected in stream 111 (since none was added). However, some residual ozone may be present in this stream. The residual ozone may be sufficiently removed to values below 10 μg/L using either the sodium sulfite quench 114 or the GAC quench 112 as described above.

The process described herein is applicable to the treatment of MIW under varying operating conditions (at various UV and ozone dosages, various ozone and hydrogen peroxide dosages, and contact times). These operating conditions may be adjusted depending on the MIW chemistry (e.g., total selenium concentrations, oxidation states of selenium species, alkalinity, total suspended solids, total dissolved solids, pH, water temperature, total and dissolved organic carbon, sulphate ion concentration, and concentrations of other organic and inorganic compounds). These variations may affect the oxidation of selenium species, but the proposed process is still suitable under varied conditions.

Advantageously, the present processes may be added at any stage of a WTF to oxidize reduced selenium species to selenate. In addition, the reagents used do not add deleterious compounds to the water being released to receiving environment, i.e., ozone and hydrogen peroxide decompose to oxygen and water and sodium sulfite is converted to sodium sulfate that already exists in the water. The process may also oxidize residual nitrite to nitrate in MIW from a biological WTF. Other advantages of the processes include short contact times, relatively low ozone and hydrogen peroxide additions, or low UV light exposure dosage in an advanced oxidation process to oxidize reduced selenium compounds to selenate.

EXAMPLES

The following examples are submitted to illustrate embodiments of the present invention. These examples are intended to be illustrative only and not intended to limit the scope of the present invention. Tests were carried out using MIW that had been biologically treated in a WTF containing various concentrations of selenium species and other constituents of interest.

Bench-scale tests were carried out to study the use of a chemical to oxidize or remove reduced selenium species in MIW (Method A) as a comparison to the processes illustrated in FIG. 1 and FIG. 2. The tests were carried out utilizing beakers holding 1-L to 2.5-L water volumes and using reagent grade chemicals. The chemicals included potassium permanganate, potassium persulfate, and hydrogen peroxide as oxidants and granular activated carbon as adsorbent. Agitation was carried out utilizing radial impellers at 150 RPM. The tests were carried out at room temperature (17° C. to 20° C.) unless otherwise specified.

Bench-scale batch AOP tests (Method B) were carried out to evaluate ozone and hydrogen peroxide dosages applicable to the process shown in FIG. 1, utilizing a glass reactor containing up to 2.5 L of MIW. Agitation was carried out using a magnetic stirrer. A mixture of oxygen and ozone gas was continuously sparged at the bottom of the reactor using a ceramic frit sparger. Ozone was generated by passing 99% Vol. oxygen gas through a bench-top corona discharge ozone generator (HG-1500 from Enaly). Hydrogen peroxide doses were added at preset times during the experiments. The ozone generation rate was approximated from equipment manufacturer data based on the oxygen gas flow rate and electrical power setting. Ozone generation rate using 0.5 L/min (STP) of 99% Vol oxygen flow rate was constant at about 10 to 20 mg of ozone per minute. The produced ozone concentration was 2% to 5% Wt. and remaining was oxygen. Treatment by AOP 104 (FIG. 1) lasted from 5 min to 60 min. After treatment, samples were aerated for 10 to 30 minutes to remove oxygen super saturation. Residual hydrogen peroxide and ozone were removed with sodium sulfite as quenching reagent. Chemical assays and spectrophotometry analytical techniques were utilized to measure the residual ozone and hydrogen peroxide in AOP treated MIW.

Bench-scale AOP tests (Method C) were carried out to evaluate UV light wavelength and dosages and ozone dosages applicable to the process illustrated in FIG. 2. A bench-top UV unit (from ozone solutions UV-LAB-DE03) was used with either a 254 nm lamp (part GL287/4, with "L" glass) or a 185 nm lamp (part G8-9150, with "VH" glass). The lamps had a nominal output power of 14 W at 380 mA current, and a diameter of 15 mm and a length of 287 mm. The UV lamp was installed inside a cylindrical chamber with a working volume of water of 0.7 L. In some tests, two UV units were used in series to increase contact time. In some examples, the feed MIW was recirculated through one UV unit using a pump at a flow rate of 0.2 L/min (2-L total water treated) for a contact time of 12 min, corresponding to a UV dose of 1.4 Wh/L (Method C.1). In other examples two UV units were connected in series, treating water at a flow rate of 0.2 L/min in a single pass treatment, corresponding to a UV dose of 2.4 Wh/L (Method C.2). In both cases, ozone was generated by passing 99% Vol. oxygen gas through a bench-top corona discharge ozone generator (HG-1500 from Enaly) as described above. The ozone gas was continuously injected in-line to the water fed to the UV units. In the UV-ozone tests, the ozone generation rate based on equipment manufacturer data using 0.5 L/min (STP) 99% Vol oxygen flow rate was constant at about 10 to 20 mg of ozone per minute. The produced ozone concentration was 2% to 5% Wt. and the remaining was oxygen. After treatment, samples were aerated for 10 to 30 minutes to remove oxygen super saturation. Residual ozone was removed with sodium sulfite as quenching reagent.

Pilot-scale testing (Method D) was also carried out for ozone-hydrogen peroxide AOP system, as shown in FIG. 1, utilizing a commercially-available AOP pilot unit for AOP 104 coupled to other equipment to carry out the dissolved oxygen removal 110, the sulfite quench 114, and the granular activated carbon quench 112. The feed to the AOP pilot plant was MIW that was previously partially treated in a full-scale biological WTF. The pilot plant feed water treatment rate was as high as 38 L/min. Ozone-oxygen gas mixture was injected to the MIW using a venturi (side stream) system. Hydrogen peroxide was added to the water prior to or shortly after injection of ozone. The water was then passed through an in-line mixer to mix fully the ozone and hydrogen peroxide, and then sent to an array of in-series contactors, each with a residence time of about 1 min for a total of 4 min contact time. Ozone was generated by passing 88% Vol. oxygen through a pilot-scale corona discharge ozone generator at oxygen flow rate of 1.7-10.8 L/min (standard temperature and pressure), producing 0.1 to 1 g/min ozone. The oxygen gas was produced from a pilot-scale pressure swing adsorption air separator unit. Produced ozone concentration in the gas phase was in the range 3-12 wt %, with the balance principally oxygen. Transferred ozone dosage was calculated from ozone concentrations in the inlet gas (containing the ozone-oxygen gas mixture) and in the off-gas. The off-gas streams from the contactors were collected and were treated using a catalytic ozone destruct unit to remove residual ozone before releasing the off-gas to atmosphere. Oxygen super saturation from the AOP-treated MIW was removed in a cascade system within the vessel for dissolved oxygen removal 110 in FIG. 1. In the quenching step, sodium sulfite 10 wt % solution was added to remove residual ozone and hydrogen peroxide to values below 10 µg/L and 0.5 mg/L, respectively. In parallel, two in-series granular activated carbon columns for a total empty bed contact time (EBCT) of 10 min were also tested to remove residual ozone and hydrogen peroxide.

Specialized analytical assay procedures were utilized to analyze the water for selenium species. These assay procedures were carried out in a commercially-certified analytical lab utilizing state-of-the-art techniques and analytical instruments:
1) Total and dissolved selenium assays were carried out by digestion of the analytes in a closed vessel (bomb) with nitric and hydrochloric acids. The dissolved selenium assay sample was filtered through a 0.45 µm filter prior to digestion. The digested samples were analyzed for selenium content using inductively coupled plasma-dynamic reaction-cell mass spectrometry (ICP-DRC-MS).
2) Selenium speciation assays were carried out by chromatographically separating the various selenium species in an ion exchange column and then quantifying them using inductively coupled plasma collision reaction cell mass spectrometry (ICP-CRC-MS).

As a reference, representative analytical detection limits (also referred to as Method Detection Limits) for the various selenium species are provided in Tables 2 and 3. Selenium assays presented in Table 4 had the analytical detection limits provided in Table 2. Selenium assays presented in Tables 5 and 6 had the analytical detection limits provided in Table 3.

Additional AOP tests were conducted at the commercial analytical lab site adjacent to the ICP-CRC-MS such that the samples were processed immediately to develop the sample preparation methods and to ensure that samples remained stable during transportation to an external analytical lab.

Experimental

Table 1 shows approximate MIW chemistry that may be treated utilizing the present method. The assays indicated in the average column approximate the water chemistry utilized to carry out some of the experiments presented in the examples. In the pilot plant campaign carried out as part of this work, MIW with the range of water composition indicated by the minimum and maximum values Table 1 was tested.

In some experiments, feed MIW was spiked with reduced selenium species to test the performance of the AOP at higher selenium concentrations.

TABLE 1

Approximate composition ranges of MIW from mining of coal

| constituents of interest | Unit | Minimum | Maximum | Average |
| --- | --- | --- | --- | --- |
| pH | s.u. | 6.5 | 8.0 | 7.3 |
| Total suspended solids, TSS | mg/L | <1 | 40 | 1.5 |
| Total dissolved solids, TDS | mg/L | 1160 | 2080 | 1671 |
| Alkalinity as $CaCO_3$ | mg/L | 295 | 576 | 341 |
| Selenium-total | µg/L | 11 | 325 | 19 |
| Selenium, Dissolved | µg/L | 10 | 333 | 17 |
| Selenium + 6 | µg/L | 0.1 | 330 | 1.5 |
| Reduced Selenium species | µg/L | 3 | 94 | 12.7 |
| Sulphate | mg/L | 534 | 907 | 821 |
| Chloride | mg/L | 4 | 182 | 74 |
| Nitrate-N | mg-N/L | <0.005 | 18.3 | 0.014 |
| Nitrite-N | mg-N/L | <0.001 | 1.9 | 0.002 |
| Ammonia-N | mg-N/L | <0.005 | 1.6 | 0.007 |
| Magnesium | mg/L | 108 | 183 | 161 |
| Calcium | mg/L | 175 | 277 | 248 |
| Total Organic Carbon (TOC) | mg/L | 0.8 | 16.4 | 1.5 |

TABLE 1-continued

Approximate composition ranges of MIW from mining of coal

| constituents of interest | Unit | Minimum | Maximum | Average |
| --- | --- | --- | --- | --- |
| Total Inorganic Carbon (TIC) | mg/L | 40 | 171 | 67 |
| UV transmittance | % | 93.5 | 98.6 | 96.3 |

In the following examples:

$Se^{+4}$ is selenite ion;

$Se^{+6}$ is selenate ion;

SeMet is selenomethionine;

MeSe is methylseleninic acid;

DMetSeO is dimethyl selenoxide,

SeCN is selenocyanate ion;

$SeSO_3$ is selenosulphate ion;

UnK represents the total concentration of any unidentified selenium-containing species detected by the speciation analytical technique;

SeD is the concentration of selenium in all dissolved selenium species in the water (samples were filtered using a 0.45 µm filter prior to analysis);

SeT is the total concentration selenium in the water;

SeTd is the sum of the concentrations of all the selenium species assayed by the ICP-CRC-MS speciation analytical technique. Note SeD can be different than SeTd as some selenium species may not be detected using selenium speciation analytical technique and because there are measurement uncertainties in both the speciation and total dissolved selenium assays causing analytical errors;

Se+6R is the Selenate Ratio expressed as the ratio of the concentration of selenium in the (+6) oxidation state to the sum of the concentrations of selenium species (SeTd). The higher this value, higher the relative proportion of selenate in the water;

ORP, mV, is the oxidation reduction potential of the solution at the end of the test (vs. Ag/AgCl);

HCl is hydrochloric acid;

$O_3$ is ozone; and $H_2O_2$ is hydrogen peroxide

In the examples below the UV lamps and the ozone generator were sufficiently run ("warmed up") for at least 15 min) prior to use to ensure stable operating conditions.

Example 1

The following example illustrates the effect of various chemicals as oxidants and an adsorbent to oxidize or remove reduced selenium species from a MIW treated in abiological WTF with water chemistry similar to that provided by the average assays in Table 1. The lab scale tests were carried out using Method A, referred to above, at room temperature (17° to 20° C.).

Reagents were added to the MIW and after 240 min of mixing, samples were collected and analyzed for the selenium species. Results are provided in Table 2. Concentrations that were below the analytical detection limit (shown in the first row of the Table) are shown as zero.

TABLE 2

| Reagent | Reagent dosage (mg/L) | ORP, mV | Selenium Speciation, μg/L | | | | | | | | Selenate ratio (%) |
|---|---|---|---|---|---|---|---|---|---|---|---|
| | | | Se+4 | Se+6 | SeMet | MeSe | SeCN | UnK | SeSO3 | SeTd | Se + 6R |
| Analytical Detection limit, μg/L | | | 0.15 | 0.3 | 0.15 | 0.15 | 0.25 | 0.30 | 0.3 | — | |
| Feed MIW | | 220 | 4.8 | 0.6 | 0 | 0 | 0 | 3.7 | 0 | 9.1 | 7 |
| H2O2 | 1000 | 214 | 0.0 | 5.7 | 0.0 | 2.3 | 0.0 | 3.2 | 0.0 | 11.2 | 51 |
| KMnO4 | 500 | 605 | 8.6 | 6.9 | 0.0 | 8.4 | 0.0 | 4.2 | 0.0 | 28.1 | 25 |
| K2S2O8 | 100 | 279 | 4.8 | 0.5 | 0.0 | 1.2 | 0.0 | 3.0 | 0.0 | 9.5 | 5 |
| Activated Carbon | 5000 | 165 | 6.1 | 4.1 | 0.0 | 0.3 | 0.0 | 0.0 | 0.0 | 10.5 | 39 |

Conclusion

Hydrogen peroxide provided the highest selenate ratio (51%). The other treatments were less effective. None of the treatments achieved the target selenate ratio of greater than 90%.

Example 2

The following example illustrates the use of AOP to treat samples of MIW that were partially treated in a WTF that utilizes a biological process to remove nitrate and selenium.

Various water samples were taken every few days from three different WTF process streams and were treated utilizing Method B and Method C.2 (using 254 nm UV lamps).

Both treatments were carried out at a water temperature ranging between 8° C. and 12° C. The results from 16 different tests are shown in Table 3. (N/A means not available and selenium assay values shown as averages for the number of tests indicated in the brackets).

For AOP treatment utilizing Method B, the applied ozone rate was constant at 9.5 mg/min. Ozone transfer efficiency was not measured as no off-gas ozone monitor was available. Ozone sparging lasted for 15 min, for a total applied ozone dosage of 57 mg/L treating 2.5 L of water. Hydrogen peroxide was dosed at 10 mg/L every 5 min starting one minute after continuous ozone sparging addition started (total hydrogen peroxide added was 30 mg/L). After 15 min of treatment utilizing ozone and hydrogen peroxide, MIW was aerated for 10 to 30 min by sparging air in the water and then samples were taken and prepared for analysis.

For AOP treatment utilizing Method C.2, ozone was injected to the feed MIW at a rate of 9.5 mg/min prior to passing it through to the UV system. After 28 minutes of continuous treatment (to ensure steady state conditions), ozone addition and UV exposure were stopped. Treated water samples were collected over the last 7 min of treatment. Total applied ozone during the 7 min of treatment was 47.5 mg/L and applied UV dose was 2.4 Wh/L. The treated water were aerated for up to 30 minutes and then samples were taken and prepared for analysis.

TABLE 3

| | Selenium Speciation, μg/L | | | | | | | | | Total and Dissolved Se, μg/L | | Selenate ratio, % |
|---|---|---|---|---|---|---|---|---|---|---|---|---|
| | Se+4 | Se+6 | SeMet | MeSe | SeCN | DMSeO | UnK | SeSO3 | SeTd | SeD | SeT | Se + 6R |
| Analytical Detection limit, μg/L → | 0.015 | 0.030 | 0.005 | 0.005 | 0.025 | 0.005 | 0.060 | 0.030 | — | 0.7 | 0.7 | |
| Feed MIW-1 Treatment (No. of repeats) | 4.7 | 0.7 | 0 | 0.13 | 0.18 | 1.4 | 0 | 0.019 | 7.1 | 10.9 | 14.1 | 10 |
| O3 + H2O2 (5) | 0.04 | 14.6 | 0 | 0.01 | 0.01 | 0.02 | 0.07 | 0 | 14.8 | N/A | N/A | 99 |
| UV + O3 (2) | 0.05 | 14.1 | 0 | 0 | 0 | 0.02 | 0.07 | 0 | 14.2 | N/A | N/A | 99 |
| Feed MIW-2 | 4.8 | 0.24 | 0 | 0.09 | 0.21 | 0.63 | 0 | 0 | 6.0 | 10.7 | 22.3 | 4 |
| O3 + H2O2 (3) | 0.06 | 16.4 | 0 | 0 | 0 | 0 | 0.17 | 0 | 16.6 | N/A | N/A | 99 |
| UV + O3 (2) | 1.1 | 15.6 | 0 | 0.01 | 0 | 0 | 0.08 | 0 | 16.8 | N/A | N/A | 93 |
| Feed MIW-3 | 0.76 | 0.08 | 0 | 0.35 | 0.81 | 0.05 | 0.03 | 0.05 | 2.1 | 7.2 | 23.7 | 4 |
| O3 + H2O2 (3) | 0.08 | 17.2 | 0 | 0 | 0 | 0.01 | 0.4 | 0 | 17.7 | N/A | N/A | 97 |
| UV + O3 (1) | 4.4 | 8.9 | 0 | 1 | 0 | 0.5 | 0.5 | 0 | 15.3 | N/A | N/A | 58 |

Conclusion

The difference between SeTd and SeD assays for the feed MIW waters revealed the presence of unaccounted reduced selenium species which were not detected by the speciation analytical procedure. The higher SeT values versus SeD indicated the presence of particulate selenium.

The AOP treatment using ozone and hydrogen peroxide and treatment using UV and ozone were both effective at increasing the proportion of selenate ion in the treated MIW as indicated by the increase in selenate ratio.

The highest selenate ratios (>96%) were consistently observed when MIW was treated with ozone and hydrogen peroxide.

For both MIW-2 and MIW-3, treatment using ozone and hydrogen peroxide was more effective than treatment using UV and ozone, with up to 4.4 μg/L of selenite still present after treating MIW-3 with ozone and UV.

Treatment of MIW-3 using UV and ozone, resulted in only 58% selenate ratio, compared to 97% using ozone and hydrogen peroxide.

Both feed MIW-2 and MIW-3 had more reduced selenium species than feed MIW-1, as indicated by the lower selenate ratio water values in feed MIW-2 and MIW-3 versus that of feed MIW-1, and the UV-ozone treatment may be less effective as a result.

Example 3

The following example illustrates the use of ozone at different pH to oxidize reduced selenium species present in MIW with and without addition of hydrogen peroxide.

The initial pH of the MIW was adjusted using hydrochloric acid, HCl. The range of pH tested was 4.6 to 8.4.

Also, feed MIW-4 and MIW-5 were spiked with reduced selenium species to assess the robustness of selenium oxidation using AOP. The assay results for the spiked feed MIW samples are shown in Table 4.

Tests were carried out under similar conditions as those described in Example 2 using ozone and hydrogen peroxide (Method B). In these tests, ozone was added to the water at an applied rate of 9.5 mg of ozone per minute. Feed MIW volume was 1.5 L and temperature was 10 to 13° C.

Ozone addition continued for either 15 minutes or 60 minutes, as indicated in Table 4. Hydrogen peroxide, if added, was dosed at 10 mg/L every 5 or 10 minutes after commencing the addition of ozone, as indicated in Table 4.

After the indicated total experiment time (15 min or 60 min), ozone addition was stopped and water was aerated for 10 to 30 minutes and then samples were taken for analysis.

selenium. After AOP treatment, the SeTd and SeD assays were within measurement uncertainty; however, indicating that most of the unaccounted selenium species were oxidized to species that were detectable by the analytical procedure.

The results shown in Table 4 demonstrate that the reduced selenium species (including selenomethionine and selenocyanate) were significantly oxidized to selenate by AOP using ozone and hydrogen peroxide, achieving a selenate ratio greater than 99%.

Ozone alone did not consistently achieve high selenate ratio values and oxidation target.

Good results were obtained using ozone and hydrogen peroxide combination, even at pH as low as 4.6.

Total organic carbon (TOC) concentrations did not decrease in these tests, indicating that mineralization of TOC (i.e., conversion or organics to carbon dioxide) was not significant.

Example 4

The following example illustrates the use of UV light with ozone to treat MIW spiked with various selenium species.

Tests were carried out at different pH (natural pH and pH-adjusted with HCl). A single UV unit was utilized with a lamp at a wavelength of either 185 nm or 254 nm. Water was recirculated through a single UV unit at a rate of 0.7 L/min from a beaker with 2 L total water volume into which

TABLE 4

| Reagent | pH | $H_2O_2$: 10 mg/L added | t, min | Selenium Speciation, μg/L | | | | | | | Dissolved Se, μg/L | TOC mg/L | Selenate ratio, % |
|---|---|---|---|---|---|---|---|---|---|---|---|---|---|
| | at | | | $Se^{+4}$ | $Se^{+6}$ | SeMet | MeSe | SeCN | UnK | $SeSO_3$ | SeTd | SeD | | Se + 6R |
| Feed MIW-4 (spiked) | 8.2 | | | 12.2 | 1.3 | 0 | 2.2 | 2.2 | 0.1 | 0.02 | 18.0 | 26.9 | 3.2 | 7 |
| $O_3$ | 8.4 | | 60 | 0.1 | 29.7 | 0 | 0.06 | 0 | 1.7 | 0 | 31.6 | 32.8 | 5.5 | 94 |
| $O_3$ | 6.1 | | 60 | 0.2 | 21 | 0 | 0.03 | 0 | 5.7 | 0 | 26.9 | 27.1 | 4.9 | 78 |
| $O_3 + H_2O_2$ | 8.6 | every 10 min | 60 | 0.04 | 27.8 | 0 | 0 | 0 | 0.05 | 0 | 27.9 | 28 | 3.3 | 100 |
| $O_3 + H_2O_2$ | 4.6 | every 10 min | 60 | 0 | 25.1 | 0 | 0 | 0 | 0.3 | 0 | 25.4 | 28.1 | 2.6 | 99 |
| Feed MIW-5 (spiked) | 8 | | | 10 | 1.1 | 1.6 | 2.5 | 1.8 | 2.3 | 0 | 19.3 | 27.1 | 1.4 | 6 |
| $O_3$ | 7.9 | | 60 | 0.1 | 19.1 | 0 | 0.1 | 0 | 2.6 | 0 | 21.9 | 26.7 | 2.2 | 87 |
| $O_3$ | 8 | | 15 | 0.1 | 18.6 | 0 | 0.1 | 0 | 2.5 | 0 | 21.3 | 25.7 | 1.7 | 87 |
| $O_3 + H_2O_2$ | 8 | every 10 min | 60 | 0 | 20.2 | 0 | 0 | 0 | 0.04 | 0 | 20.2 | 28.5 | 1.7 | 100 |
| $O_3 + H_2O_2$ | 8.1 | every 5 min | 15 | 0 | 20.3 | 0 | 0 | 0 | 0.05 | 0 | 20.4 | 26.5 | 1.5 | 100 |

Conclusion

The difference between SeTd and SeD assays for the feed MIW waters tested revealed the presence of unaccounted reduced selenium species in the feed MIWs which were not detected by the speciation analytical procedure. The higher SeT values versus SeD indicated the presence of particulate ozone was continuously sparged (Method C.1). Water temperature was kept at 12 to 15° C.

Ozone was added at a rate of 9.5 mg/min to a total of 57 mg/L over 12 minutes of. The total UV dose was 1.4 Wh/L. After 12 minutes of treatment, ozone addition and UV exposure were stopped. The water was aerated for up to 30 minutes and then samples were taken for analysis.

TABLE 5

| | pH | $Se^{+4}$ | $Se^{+6}$ | SeMet | MeSe | SeCN | UnK | $SeSO_3$ | SeTd | Dissolved Se assay, μg/L SeD | TOC mg/L | Se + 6R |
|---|---|---|---|---|---|---|---|---|---|---|---|---|
| Feed MIW-6 (spiked) | 7.9 | 16.6 | 1.2 | 0.02 | 4.4 | 0.7 | 0.6 | 0.08 | 23.4 | 29.7 | 1.8 | 5 |
| 185 nm | 8 | 0.2 | 26 | 0 | 0.03 | 0 | 0.52 | 0 | 26.1 | 28.9 | 2.7 | 98 |
| 185 nm | 6.1 | 7 | 16 | 0 | 0.03 | 0 | 1.1 | 0 | 24.5 | 29.2 | 2.6 | 67 |
| Feed MIW-7 (spiked) | 7.9 | 20.3 | 1.3 | 0 | 9.4 | 0.05 | 0.7 | 0.02 | 31.7 | 33.5 | 1.8 | 4 |
| 254 nm | 8 | 0.2 | 28 | 0 | 0.04 | 0 | 0.8 | 0 | 28.3 | 31.1 | 2.6 | 97 |
| 254 nm | 6.2 | 12.8 | 14 | 0 | 0.2 | 0 | 1.7 | 0 | 28.8 | 32.3 | 3.9 | 50 |

Conclusion

Sufficient oxidization of reduced selenium species was achieved (selenate ratio higher than 97%) utilizing ozone and UV light, at both tested wavelengths, at pH 8. Oxidation of selenium species was not sufficient at pH 6.1-6.2 (selenate ratio 67% and 50%).

Total organic carbon (TOC) concentration did not decrease indicating that mineralization of TOC did not occur.

Example 5

Examples 1 to 4 indicate that AOP treatments with either ozone and hydrogen peroxide or UV and ozone can successfully oxidize reduced selenium species. However, these examples were conducted at a small bench scale and mostly batch mode in which important process parameters, including ozone transferred to the water, were not measured.

Example 5 illustrates the treatment of MIW from a biological WTF using ozone and hydrogen peroxide AOP and ozone only. A pilot-scale AOP system was utilized to validate the success of AOP treatment at larger scale and continuous operating mode and to verify full-scale ozone transfer, contact time, and identify other process parameters.

Tests were carried out according to Method D and the process shown in FIG. 1 to test the ozone and hydrogen peroxide AOP at different operating conditions. Tests ran for several months at a temperature of 9° C. to 11° C., at a water treatment rate of 38 L/min, a pH of 7.3 to 7.6, and a contact time of 4 minutes. The pilot plant feed MIW composition was consistent with values listed in the "Average" column of Table 1.

The AOP system was operated at constant transferred ozone dosage. The hydrogen peroxide dosing rate was adjusted to obtain 0.5-1 mg/L residual hydrogen peroxide in stream 105 of FIG. 1 after the AOP step 104. The residual ozone concentration in stream 105 after the AOP step 104 was usually less than 10 μg/L, but was as high as 2 mg/L. The measured dissolved oxygen in this stream was generally 30-40 mg/L.

Transferred ozone dosage was calculated from the ozone gas concentrations measured in the feed gas stream and in the off-gas streams and water flow rate.

After the AOP, oxygen super saturation was normally removed by a cascade system as described above as Method D. Residual oxidants (ozone and hydrogen peroxide) were removed to values below 10 μg/L and 0.5 mg/L, respectively, utilizing a sodium sulfite quench system or a granular activated carbon bed with 10 min EBCT as referred to above as Method D.

A sodium sulfite dosage of 20 mg/L was found to be sufficient to achieve the target for the residual oxidants. Samples of stream 116 were taken after sulfite quenching for selenium speciation. The selenium speciation assays are shown in Table 6.

TABLE 6

| Treatment | $H_2O_2$ added mg/L | Ozone transferred Dosage, mg/L | $Se^{+4}$ | $Se^{+6}$ | SeMet | MeSe | SeCN | DMetSeO | UnK | $SeSO_3$ | SeTd | Total and Dissolved Se, μg/L SeD | SeT | Selenate ratio, % Se + 6R |
|---|---|---|---|---|---|---|---|---|---|---|---|---|---|---|
| Feed MIW-8 | — | — | 3.8 | 0.5 | 0 | 0.1 | 0.1 | 1.3 | 0 | 0 | 5.8 | 10.4 | 14.3 | 8 |
| $O_3$ | 0 | 4.7 | 0.1 | 9.8 | 0 | 0.1 | 0.0 | 1.5 | 5.2 | 0 | 16.7 | 14.6 | 15.7 | 59 |
| Feed MIW-9 | — | — | 2.9 | 0.7 | 0.0 | 0.1 | 0.1 | 1.4 | 0.0 | 0 | 5.2 | 10.9 | 13 | 13 |
| $O_3 + H_2O_2$ | 1.2 | 5.1 | 0.05 | 13.2 | 0 | 0.00 | 0 | 0.1 | 0.9 | 0 | 14.3 | 13.6 | 13.8 | 93 |
| $O_3 + H_2O_2$ | 2.0 | 5.1 | 0.15 | 13.1 | 0 | 0.03 | 0 | 0.1 | 1.1 | 0 | 14.5 | 13.4 | 14.1 | 90 |
| Feed MIW-10 | — | — | 2.8 | 0.7 | 0.0 | 0.13 | 0.2 | 1.6 | 0.0 | 0 | 5.4 | 10.2 | 12 | 14 |
| $O_3 + H_2O_2$ | 1.6 | 7.9 | 0.05 | 12.6 | 0 | 0.02 | 0 | 0.2 | 1.1 | 0 | 13.9 | 13.5 | 13.8 | 91 |
| $O_3 + H_2O_2$ | 3.0 | 7.7 | 0.16 | 13.4 | 0 | 0 | 0 | 0.1 | 0.4 | 0 | 14.0 | 13.6 | 14.8 | 96 |

Conclusion

As in previous Examples, SeTd was less that SeD assays for the feed MIW waters tested, indicating the presence of unaccounted reduced selenium species, which were not detected by the speciation analytical procedure. However, after AOP treatment, the SeTd and SeD assays were within measurement uncertainty, indicating that most of the unaccounted selenium species were oxidized to species that were detectable by the analytical procedure.

Ozone alone was not effective at oxidizing all reduced selenium species to selenate.

Ozone and hydrogen peroxide AOP achieved the target selenate ratio (greater than 90%) at a relatively short contact time of four minutes.

Integration of oxygen removal, ozone destruction, and quenching as part of an AOP system were also demonstrated in a pilot plant operating in a continuous mode.

AOP oxidized some of the insoluble selenium, indicated by smaller diffidence between SeT and SeD and the increase of the SeD after AOP than before.

The total and dissolved selenium assays after AOP treatment were close to one other, unlike in the feed MIW before AOP treatment.

In the feed MIW, a fraction of the selenium species could not be accounted for by the speciation technique, but after AOP treatment, most of the soluble selenium species could be accounted for in the analytical technique used.

tively, utilizing a sodium sulfite quench system or a granular activated carbon bed with 10 min EBCT as referred to above as Method D.

A sodium sulfite dosage of 20 mg/L was found to be sufficient to achieve the target for the residual oxidants. Samples of stream 116 were taken after sulfite quenching for selenium speciation.

The selenium speciation assays after the sulfite quench step are shown in Table 7. The bracketed numbers indicates the number of samples used to calculate the average values shown.

TABLE 7

| Treatment | $H_2O_2$ added mg/L | Ozone transferred Dosage, mg/L | Selenium Speciation, μg/L | | | | | | | | Total and Dissolved Se, μg/L | | Selenate ratio % |
|---|---|---|---|---|---|---|---|---|---|---|---|---|---|
| | | | $Se^{+4}$ | $Se^{+6}$ | SeMet | MeSe | SeCN | DMetSeO | UnK | $SeSO_3$ | SeTd | SeD | SeT | Se + 6R |
| Feed MIW-11 (spiked) | (1) | | 44.2 | 0.9 | 0 | 0.2 | 0.1 | 1.3 | 0 | 0 | 46.7 | 63.5 | 61.7 | 2 |
| $O_3 + H_2O_2$ (2) | 3.7 | 4.9 | 0.9 | 59.5 | 0 | 0 | 0 | 0.01 | 0.38 | 0 | 60.8 | 65.5 | 57.0 | 98 |
| Feed MIW-12 (spiked) | (8) | | 38.4 | 1.0 | 0 | 0.10 | 0.09 | 1.8 | 0.10 | 0.0 | 41.4 | 56.2 | 55.3 | 2.3 |
| $O_3 + H_2O_2$ (8) | 6.9 | 11.0 | 0.39 | 56.4 | 0.0 | 0.003 | 0.0 | 0.003 | 0.15 | 0.007 | 57.0 | 61.8 | 57.9 | 99 |
| Feed MIW-13 (spiked) | (2) | | 43.4 | 1.1 | 0 | 0 | 0 | 2.20 | 0.10 | 0 | 47.0 | 62.1 | 57.3 | 2 |
| $O_3 + H_2O_2$ (2) | 10.9 | 11.3 | 0.3 | 58.0 | 0 | 0 | 0 | 0.00 | 0.19 | 0 | 58.5 | 67.3 | 62.1 | 99 |

MIW partially treated in a WTF was used in these tests. The MIW had a significant level of background components (e.g., sulfate, carbonate, chloride ions and total suspended solids) that did not impair the AOP performance.

Example 6

Example 6 illustrates treatment of MIW from a biological WTF thaw was also spiked with additional constituents of interest using ozone and hydrogen peroxide AOP. The pilot-scale AOP system of Example 5 was utilized to validate the success of AOP treatment at larger scale and continuous operating mode and to verify full-scale ozone transfer, contact time, and identify other process parameters.

Tests were carried out according to Method D and process shown in FIG. 1 to test the ozone and hydrogen peroxide AOP at higher concentrations constituents of interest. Tests ran for several days at a temperature of 9° C. to 10° C., at a water treatment rate of 38 L/min, a pH of 7.5 to 8.0, and a contact time of 4 minutes.

These tests illustrate the performance of the AOP system at higher alkalinity (440-508 mg/L), chloride (157-179 mg/L), TDS (1974-2015 mg/L), TIC (123-135 mg/L using sodium bicarbonate), pH (7.6-7.7), and dissolved selenium (56-66 μg/L) than for the tests of Example 5. The feed to the pilot AOP system was otherwise similar to that in Example 5.

The AOP system was evaluated at three transferred ozone dosages. The hydrogen peroxide dosing rate was adjusted to obtain 0.5-1 mg/L residual hydrogen peroxide in stream 105 of FIG. 1 after the AOP step 104. The residual ozone concentration in stream 105 after the AOP step 104 was usually less than 10 μg/L, but was as high as 2 mg/L. The measured dissolved oxygen in this stream was in the range 34-50 mg/L.

Transferred ozone dosage was calculated from the ozone gas concentrations measured in the feed gas stream and in the off-gas streams and water flow rate.

After the AOP, oxygen super saturation was normally removed by a cascade system as described above as Method D. Residual oxidants (ozone and hydrogen peroxide) were removed to values below 10 μg/L and 0.5 mg/L, respec- Conclusion As in previous Examples, SeTd was less that SeD assays for the feed MIW waters tested, indicating the presence of unaccounted reduced selenium species, which were not detected by the speciation analytical procedure. However, after AOP treatment, the SeTd and SeD assays were closer, indicating some unaccounted selenium species were oxidized to species that were detectable by the analytical procedure.

Ozone and hydrogen peroxide AOP achieved above the target selenate ratio (greater than 90%) at a relatively short contact time of four minutes.

Integration of quenching as part of an AOP system was also demonstrated in a pilot plant operating in a continuous mode.

AOP oxidized some of the insoluble selenium, indicated by the increase of the SeD after AOP than before.

In the feed MIW, a fraction of the selenium species could not be accounted for by the speciation analytical technique, but after AOP treatment, most of the soluble selenium species could be accounted for.

MIW partially treated in a WTF and spiked with alkalinity, selenite, and chloride was used in these tests. The higher concentrations of these constituents of interest than in Example 5 did not impair the AOP performance.

The above-described embodiments of the application and the examples are examples only. Alterations, modifications, and variations can be applied to the particular embodiments by those skilled in the art without departing from the scope of the application, which is defined solely by the claims appended hereto.

What is claimed is:

1. A process comprising:
   treating mine impacted water (MIW) containing one or more reduced selenium species by subjecting the MIW to an advanced oxidation process (AOP) including ozone at a transferred ozone dose of from 3 mg/L to 25 mg/L and hydrogen peroxide at a dose of from 1 mg/L to 25 mg/L, for a contact time of from 1 min to 10 min, oxidizing the one or more reduced selenium species to selenate and thereby producing an AOP treated water having at least 90% of the total dissolved selenium present in the AOP treated water present as selenate, followed by removing residual oxidants from the AOP treated water.

2. The process according to claim 1, wherein a mass ratio of hydrogen peroxide to ozone is 0.2 to 2.

3. The process according to claim 1, wherein a mass ratio of hydrogen peroxide to ozone is from 0.3 to 0.7.

4. The process according to claim 1, wherein a concentration of residual hydrogen peroxide after AOP step is 0.5 to 1 mg/L.

5. The process according to claim 1, wherein a contact time of the AOP step is preferably from 3 to 6 minutes.

6. The process according to claim 1, comprising subjecting the AOP treated water to a cascade system prior to removing residual oxidants.

7. The process according to claim 1, wherein removing residual oxidants comprises subjecting the AOP treated water to a granulated activated carbon quench.

8. The process according to claim 7, wherein removing residual oxidants comprises subjecting the AOP treated water to a column of granulated activated carbon with empty bed contact time of from 2 to 10 minutes.

9. The process according to claim 1, wherein removing residual oxidants comprises subjecting the AOP treated water to a chemical reductant.

10. The process according to claim 9, wherein the chemical reductant for quenching is sodium sulfite 5 to 25 wt % solution or in solid form.

11. The process according to claim 9, wherein the chemical reductant quench comprises sodium sulfite added at a concentration of 10 to 80 mg/L.

12. The process according to claim 9, wherein the chemical reductant quench comprises sodium sulfite added at a concentration of about 20 mg/L.

13. The process according to claim 1, wherein the MIW comprises ground water from a mining operation containing one or more selenium species.

14. The process according to claim 1, wherein the MIW comprises run-off water after contact with rock dumps from mining of coal.

15. The process according to claim 1, wherein the MIW comprises run-off water after contact with rock dumps from mining of zinc or copper.

16. The process according to claim 1, wherein the MIW is partially or fully treated in a water treatment facility (WTF).

17. The process according to claim 16, wherein the WTF comprises a biological process.

18. The process according to claim 16, wherein the WTF comprises a physical-chemical process.

19. The process according to claim 16, wherein the WTF comprises a combination of physical-chemical and biological processes.

20. The process according to claim 1, wherein the MIW temperature fed to the AOP is from 1° C. to 30° C.

* * * * *